Dec. 9, 1958        R. O. BILLINGS        2,863,397
APPARATUS FOR HANDLING AUTOMOBILES
Filed May 20, 1953        3 Sheets-Sheet 1
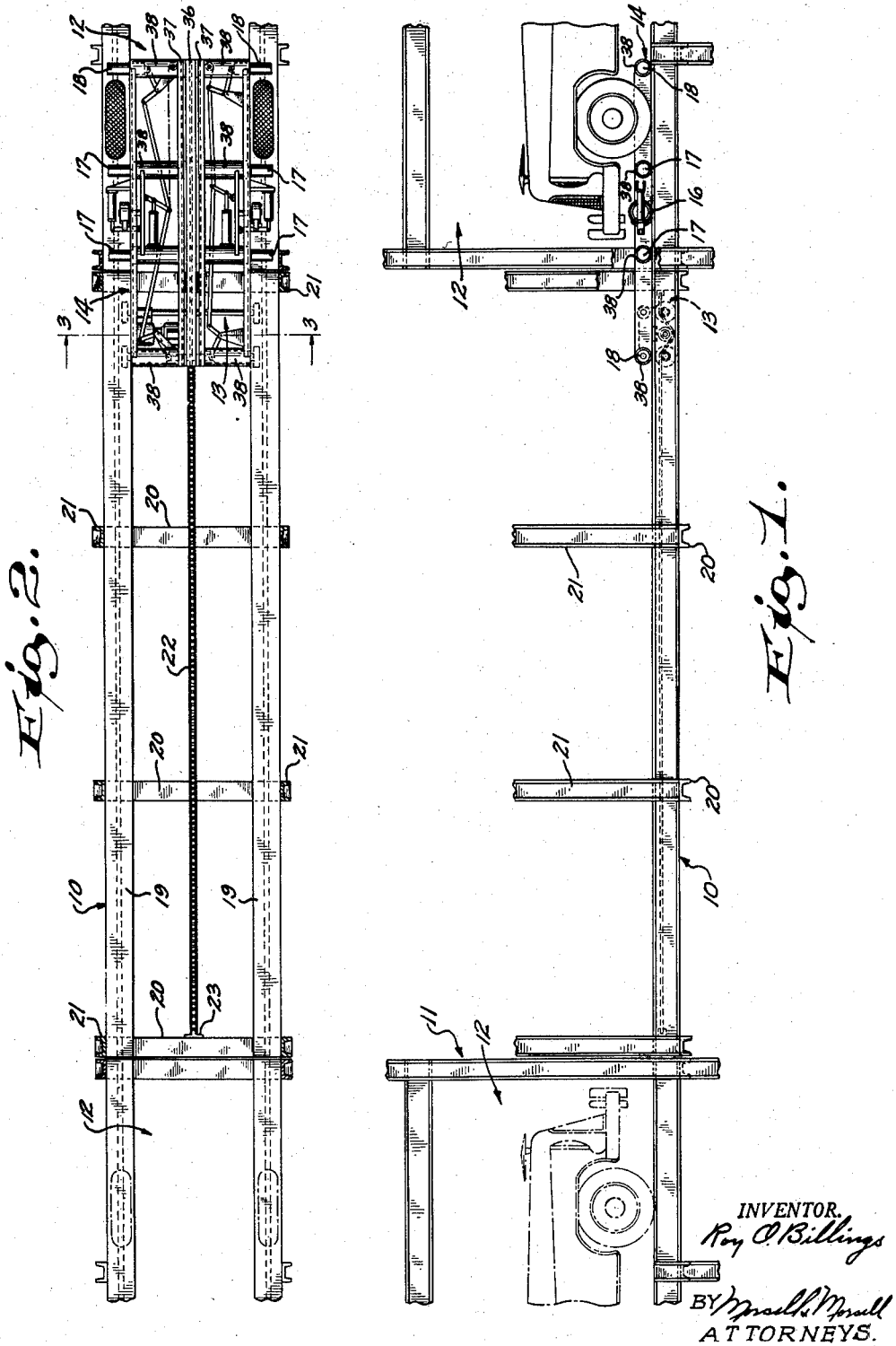
INVENTOR.
Roy O. Billings
BY
ATTORNEYS.

Dec. 9, 1958   R. O. BILLINGS   2,863,397
APPARATUS FOR HANDLING AUTOMOBILES
Filed May 20, 1953   3 Sheets-Sheet 2
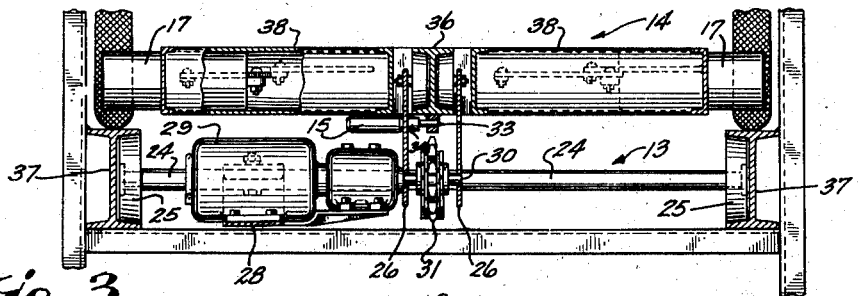
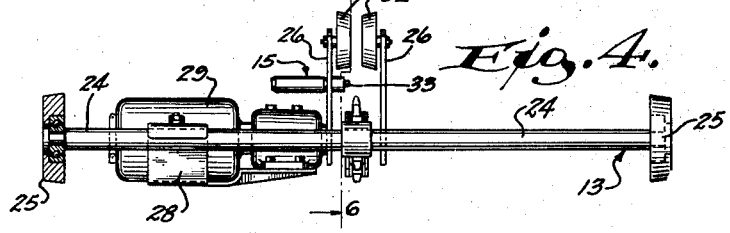
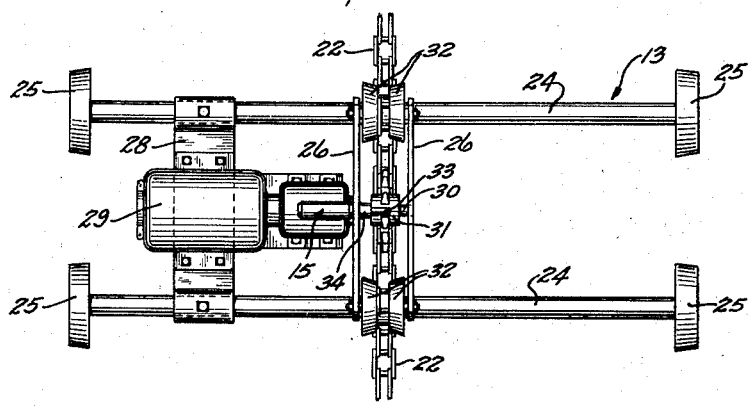
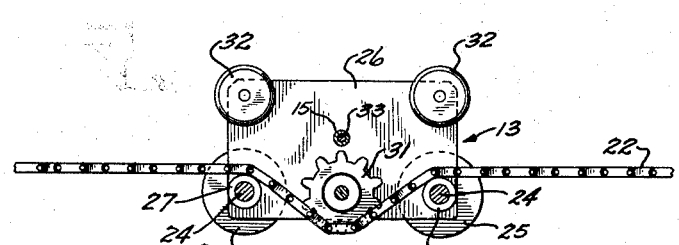
INVENTOR
Roy O. Billings
BY Morrell & Morrell
ATTORNEYS.

Dec. 9, 1958 R. O. BILLINGS 2,863,397
APPARATUS FOR HANDLING AUTOMOBILES
Filed May 20, 1953 3 Sheets-Sheet 3
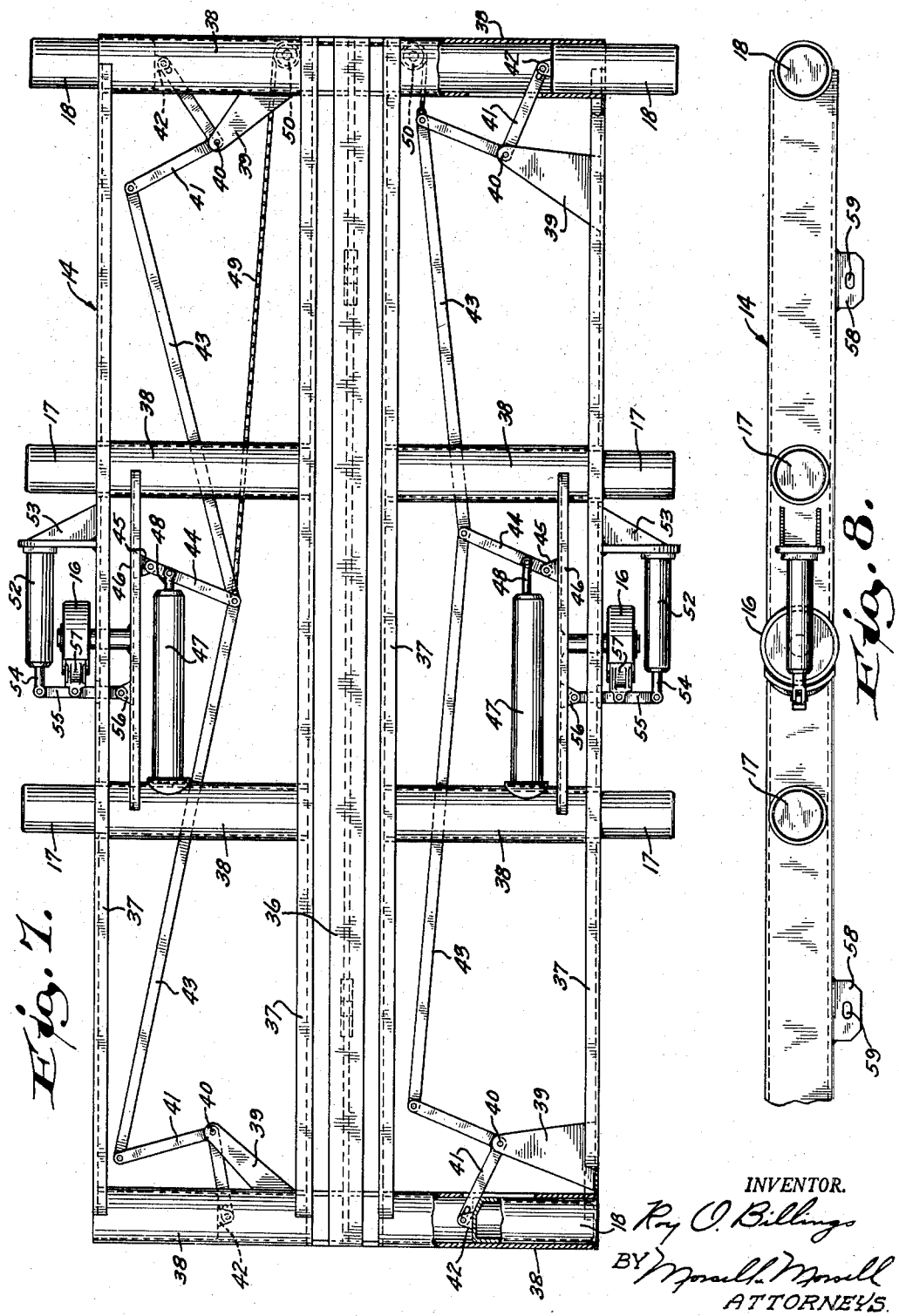
INVENTOR.
Roy O. Billings
BY
ATTORNEYS.

United States Patent Office 2,863,397
Patented Dec. 9, 1958

2,863,397

APPARATUS FOR HANDLING AUTOMOBILES

Roy O. Billings, Milwaukee, Wis.

Application May 20, 1953, Serial No. 356,144

8 Claims. (Cl. 104—50)

This invention relates to improvements in apparatus for handling automobiles.

While numerous forms of devices have been produced for the purpose of facilitating the handling of automobiles for temporarily housing them in commercial garages, the majority of these devices have been extremely complicated both in structure and mode of operation. As the result of these conditions, the devices have not proved entirely satisfactory for their intended purpose.

The primary object of the present invention resides in the provision of a new and improved automobile handling apparatus adapted to function in a simple and effective manner to provide automatic or semi-automatic means for transferring an automobile to and from any of a plurality of selected stalls arranged in side by side position on successive floors of a building and disposed at opposite ends of a movable main carrying or elevator structure.

A further object of the invention resides in the provision of a new and improved carriage adapted for selective longitudinal movement on the main carrying structure.

Another object of the invention resides in the provision of a new and improved dolly supported on the main carrying structure and including fixed and retractable automobile engaging means for providing the motivating force to effect movement of the automobile into and out of storage position in any preselected stall in the building.

Another object of the invention resides in the provision of coupling means for selectively connecting the carriage to the dolly in one of a plurality of positions whereby movement of the carriage to one or the other of its extreme positions on the main carrying structure serves to effect the displacement of one or the other extremity of the dolly into the selected stall beyond an end of the main carrying structure to provide a means by which an automobile may be positioned in or removed from any particular stall under the influence of the automobile engaging means carried by the dolly.

Another object of the invention resides in the provision of power driven means for effecting the longitudinal movement of the carriage on the main carrying structure.

A more specific object of the invention resides in the provision of a chain, or toothed rack element, and a cooperating power driven gear member respectively, forming a part of either said main carrying structure or the carriage structure to provide the means for effecting relative movement between the carriage and the main carrying structure.

Another object of the invention is to provide a double ended dolly having a plurality of fixed, outwardly extending automobile engaging members, and a plurality of retractable automobile engaging members disposed in spaced relationship with the fixed members and arranged for selective movement into and out of cooperating relationship with the fixed automobile engaging members to selectively provide car engaging means adjacent both ends of the dolly.

Another object of the invention resides in the provision of new and improved means for effecting the extension or retraction of the movable automobile engaging means to selectively engage or disengage the driving connection between the dolly and the automobile.

Other objects and advantages will become apparent from the following description of an illustrative embodiment of the present invention shown in the accompanying drawing.

In the drawing:

Fig. 1 is a side elevational view illustrating the use of an automobile handling device constructed in accordance with the teachings of the present invention, parts being broken away;

Fig. 2 is a top plan view of the device shown in Fig. 1;

Fig. 3 is an enlarged vertical transverse sectional view, taken on the line 3—3 of Fig. 2, showing the driving means for effecting longitudinal movement of the carriage on the main carrying structure; coupling means for establishing a driving connection between the carriage and the dolly; and retractable automobile engaging means which form a portion of the dolly;

Fig. 4 is an end elevational view of the carriage mechanism of the device;

Fig. 5 is a top plan view of the carriage mechanism shown in Fig. 4;

Fig. 6 is a fragmentary vertical sectional view, taken on line 6—6 of Fig. 4, showing a portion of the carriage supported mechanism which is operative to effect the guiding movement of the dolly and establish a driving connection between the carriage and the dolly;

Fig. 7 is a top plan view of the dolly including the dolly supporting wheels, the fixed automobile engaging means and the retractable automobile engaging means together with suitable braking means operative upon the dolly supporting wheels, and further showing suitable actuating means for effecting the selective extension or retraction of the movable automobile engaging means disposed at opposite ends of the dolly; and Fig. 8 is a fragmentary side elevational view of the dolly shown in Fig. 7, showing a pair of longitudinally spaced coupling receiving elements adapted for selective engagement with the coupling means mounted on the carriage to provide suitable means for establishing the desired relative position between the carriage and dolly to insure the movement of the dolly beyond one or the other end of the main carrying structure.

The automobile handling apparatus, shown in the accompanying drawing, is constructed in accordance with the teachings of the present invention, and is adapted to be incorporated in a commercial garage in which automobiles may be temporarily housed. The building construction includes suitable entrance and exit openings and a centrally disposed elevator shaft flanked on two sides by a plurality of stalls disposed on each floor and arranged in close side by side positioning. The elevator, or main carrying structure, is arranged for both vertical and lateral movement in the elevator shaft as is well known in the art so that an end of the main carrying structure may be selectively alined with any preselected stall in the entire bank of stalls. Prior patents disclosing structures of this general type are my issued Patent No. 2,667,983, Harnischfeger Patent No. 1,938,658, and Beecher Patent No. 1,779,998.

Since the present invention is directed primarily to the apparatus for effecting the transfer of an automobile to or from any preselected stall on any floor in the building, applicant has eliminated specific reference to the building and elevator structure and the well-known means for effecting the vertical or lateral movement of the elevator in the elevator shaft such as shown in the prior patents above referred to.

The reference to the elevator, or main carrying structure, is confined to a support on which a carriage and a dolly may be moved either independently or in coupled relationship to effect the desired transfer of an automobile from the main carrying structure to a preselected empty stall or from a stall back onto the main carrying structure.

Referring more particularly to Fig. 1 of the drawing, it will be noted that the main carrying structure 10 is disposed for vertical and lateral movement, as is well known in the art, in an elevator shaft 11 delineated by banks of stalls 12 arranged in superimposed relationship on successive floors of the building and positioned in close proximity with each end of the main carrying structure 10. A carriage 13 is supported by and guided for longitudinal movement on the main carrying structure 10, and a dolly 14, also supported for longitudinal movement on the main carrying structure 10, is adapted for selective positioning with respect to the carriage 13 through the medium of a suitable coupling means 15. The dolly 14 is supported on a pair of axially alined spaced wheels 16 arranged substantially midway between the ends of the dolly 14. It should be noted at this point that the dolly is provided with fixed and movable automobile wheel engaging means 17 and 18, respectively, disposed in symmetrical spacing with respect to the supporting wheels 16 to provide a double ended structure.

Before entering into a detailed description of the structure of the various elements of the entire device, it is believed that a general description of its operation will serve to facilitate a ready understanding of the function and operation of the device.

With the dolly 14 disposed wholly on the elevator 10, and with the carriage 13 under one or the other of the ends of the dolly 14, an automobile may be driven onto the main carrying structure 10, preferably from the end opposite that at which the carriage is located, to a point at which the front wheels of the vehicle engage the fixed automobile engaging means 17 on the dolly 14. The movable automobile engaging means 18 may then be extended to project behind the front wheels of the vehicle. With the automobile thus positioned on the main carrying structure 10, the elevator or main carrying structure 10 may be raised to the desired floor and moved laterally until the end of the structure 10 is in alinement with the desired storage stall 12. With the automobile carrying surface of the main structure 10 in exact alinement with the car carrying surface of the stall 12, and with the main carrying structure in lateral alinement with the preselected stall 12, the means for effecting longitudinal movement of the dolly 14 on the main structure 10 may be set in operation to effect the transfer of the automobile from the main carrying structure 10 into the selected stall 12.

When the automobile is properly located in the stall 12, the movable automobile engaging means 18 may be retracted, and the dolly 14 may then be run back onto the main carrying structure 10 so that the device is again ready to effect the similar positioning of another automobile. When it is desired to remove an automobile from a preselected stall, the main carrying structure 10 is elevated to the proper floor and moved laterally to the proper stall. With this desired positioning of the main carrying structure 10 properly effected, the dolly 14 may be driven to project beyond the selected end of the main carrying structure 10 (see right hand end of Fig. 1) to a position in which the fixed automobile engaging means 17 contact the front wheels of the vehicle. The movable automobile engaging means 18, which have been previously retracted, may then be extended to a position behind the front wheels of the automobile and the dolly 14 may then be driven toward the opposite end of the main carrying structure 10 to effect the transfer of the automobile from the particular storage stall 12 onto the main carrying structure. When the automobile reaches a position on the main carrying structure 10 where the rear bumper is clear of the end of the stall 12, the elevator may be moved to return the vehicle to the ground floor where it may be backed off of the main carrying structure 10 after the movable car engaging means 18 have been retracted.

With this general operation in mind, a detailed description of the structure and mode of operation of the device will serve to emphasize the structural and functional advantages of the several elements which cooperate in a manner to provide a facile means for effecting the transfer of an automobile to and from a preselected storage stall by means of the present invention.

The main carrying structure 10 comprises a pair of longitudinal members 19, preferably in the form of I-beams, maintained in laterally spaced, fixed, parallel relationship by a plurality of transverse members 20, and including a plurality of parallelly arranged, vertically disposed members 21, located along the outer marginal side edges of the members 19, thus leaving the ends of the main carrying structure 10 open to permit an automobile to be driven onto or off of the main carrying structure 10. The upright members 21 also serve to support a suitable superstructure (not shown) by which the carrying structure 10 may be raised or lowered, or moved laterally in the elevator shaft 11. The main carrying structure 10 is completed by the inclusion of a suitable rack member 22, presently illustrated as a chain, disposed longitudinally of the structure 10 and lying parallel with and substantially midway between the members 19. In the present instance, the respective ends of the chain 19 are anchored to suitable lugs 23 attached to the inner sides of the transverse members 20 disposed at opposite ends of the structure 10. The chain 22 provides a means, to be later described, which cooperates with power driven means on the carriage 13 to effect longitudinal movement of the carriage on the structure 10.

The carriage 13 comprises a pair of laterally spaced bars or axles 24 provided at their outer extremities with wheels 25 journaled on antifriction bearings. The length of the axles 24 is such that the wheels 25 are supported by and guided for movement along the lower inner flange portion of the I-beams 19. The axles 24 are maintained in laterally spaced relationship by means of a pair of vertically arranged parallelly disposed plates 26 through which they pass. Suitable spacer sleeves 27, positioned on the axles 24 between the plates 26, serve to maintain the proper spaced relationship between the plates and also to form guide trunnions over which the length of chain 22 is guided. Additional means for maintaining the axles 24 in parallel spaced relationship comprises a strap 28 secured in any appropriate manner to the axles 24 and disposed at one side of one of the plates 26 to provide a support for an electric motor 29 including a power output shaft 30 extending through the plates 26 and carrying a driving sprocket 31 positioned between the plates 26 and adapted to mesh with the links of the chain 22 to afford the driving connection between the carriage 13 and the chain 22 to effect longitudinal movement of the carriage on the main carrying structure 10. Each of the vertically disposed parallelly arranged plates 26 provides a mounting means for a pair of guide rollers 32 arranged in parallel relationship and disposed above the axles 24. Each of the guide rollers 32 on one of the plates 26 cooperates with a companion roller 32 mounted on the other plate 26 to delineate a passage through which a member of the dolly 14 is adapted to pass while the rollers 32 provide a partial support and guide means for said member of the dolly 14.

Suitable coupling means 15, in the form of a solenoid actuated plunger 33 is mounted on one of the vertically disposed plates 26 of the carriage 13. This plunger 33 is guided for axial movement in a boss 34 carried by the plate 26 and may assume any usual or desired form, either spring urged or not, as desired, as long as it includes a projecting end adapted to cooperate with appropriate means carried by a member of the dolly 14 to afford a medium by which the dolly 14 and the carriage 13 may be releasably connected, as shown in Fig. 3.

The dolly 14 (see Fig. 7) comprises a framework including a longitudinally disposed centrally located I-beam 36 flanked on both sides by a pair of parallelly arranged longitudinally frame members 37 which are preferably of channel form having greater height than width and having a flange portion of each member directed toward its cooperating member. The members 37 and I-beam 36 are retained in spaced parallel relationship by means of a plurality of transverse members 38, preferably of tubular form. In the present instance, I have chosen to utilize four of these tubular members 38, arranged in pairs in laterally spaced relationship at opposite sides of the transverse center of the dolly. The two transverse tubular members 38 disposed adjacent the transverse center of the dolly 14 provide a means for supporting the fixed automobile abutment means 17 which project laterally beyond the outer frame members 37. The extreme tubular members 38, disposed at opposite ends of the dolly 14 respectively, provide housing means for retractable or movable automobile engaging means 18 in the form of tubular plungers.

From the foregoing description, with reference to the dolly 14, it will be noted that the structure provides a double ended device, each end of which includes retractable automobile engaging means 18. In view of the fact that one or the other end of the dolly is selectively used to effect the transfer of an automobile to or from the main carrying structure 10, and that both ends of the dolly 14 are never used simultaneously, it is deemed advisable to provide suitable operating and coupling means to effect the simultaneous retraction of the movable automobile engaging means 18, disposed at one end of the dolly at the same time that the other pair of movable automobile engaging means 18, disposed at the other end of the dolly are extended into active position. To effect this simultaneous synchronized movement of the respective pairs of movable automobile engaging means 18, I have provided suitable connecting means in the form of linkage connecting the pairs of movable automobile engaging means 18 located at each end of the dolly 14 and disposed on opposite sides of the longitudinal center of the dolly 14. Since these linkage arrangements are identical, a description of one will serve for both. A mounting bracket 39 secured to or adjacent each of the outer transverse tubular members 38 projects inwardly to provide a pivotal support 40 for a bell crank 41 having the free end of one arm pivotally connected to a lug 42 secured to the inner end of the movable car engaging means 18. The other arm of the bell crank 41 is pivotally connected to one end of a rod 43 having its other end similarly connected to the free end of a lever arm 44, the latter having its other end pivotally connected to a lug 45 mounted on a bracket 46 supported between the inner transverse frame members 38.

A solenoid 47 secured at one end to one of the transverse frame members 38 includes a tail rod 48 having its outer end pivotally secured to the lever arm 44 intermediate its ends, to provide the means by which the respective movable automobile engaging means 18, disposed to one side of the longitudinal axis are operated simultaneously and in opposite directions. Obviously, the solenoid 47 may be replaced by either a pneumatic or hydraulic type cylinder which may be energized in any appropriate manner by conventional valve controlling means. In the present instance, I utilize one of the solenoids 47 to cause extension of the pair of movable automobile engaging means 18 disposed at one end of the dolly 14 and the other solenoid 47 to effect the retraction of this pair of movable automobile engaging means.

In order to insure the synchronized action of the respective pairs of movable automobile engaging means 18 in opposite directions at the opposite ends of the dolly 14, I provide a connecting chain 49 between the operating mechanisms disposed on opposite sides of the longitudinal center of the dolly 14. One end of the chain 49 is secured to the end of one of the lever arms 44, and the other end of the chain is connected to the arm of the bell crank 41 to which one of the rods 43 is connected. The intermediate portion of the chain 49 is trained around guide pulleys 50 positioned in the transverse member 38 located at one end of the dolly 14.

The dolly 14 is supported for rolling movement along the upper surface of the longitudinal frame members 19 of the main carrying structure 10 by the pair of axially alined wheels 16 disposed exteriorly of the outer longitudinal frame members 37 of the dolly 14 and journaled on supports carried by the brackets 46. It should be noted at this point that the axis of the wheels 16 is disposed substantially midway between the ends of the dolly.

In order to more readily control and prevent undesired movement of the dolly 14, suitable braking means is provided to be effective upon the dolly supporting wheels 16. This braking means includes a brake solenoid 52 having one end mounted on a bracket 53 projecting outwardly from each of the longitudinal frame members 37 of the dolly 14. The solenoid 52 houses a piston having the projecting end of its tail rod 54 pivotally mounted on one end of a lever arm 55, the other end of which is pivotally mounted on a lug 56 carried by the bracket 46. A brake shoe 57, supported intermediate the ends of the lever arm 55, is movable into and out of engagement with each of the wheels 16, under the action of the brake solenoid, to effect the application or release of the braking action. Identical mechanism is provided on the opposite side of the dolly 14 to effect similar and simultaneous braking action on the other dolly supporting wheel 16.

Referring more particularly to Figure 8, it will be noted that the longitudinally disposed I-beam 36 of the dolly 14 is provided with a pair of depending lugs 58 secured to the lower surface of the I-beam and respectively disposed intermediate the transverse center and the opposite ends of the dolly 14. Each of these lugs is provided with an aperture 59 adapted to selectively receive the projecting end 35 of the manually operable plunger 33 of the coupling 15 to provide the means whereby the carriage and dolly are connected for coupled movement with respect to the main carrying structure 10.

It should be noted at this time that the selective coupling of the carriage 13 with the dolly 14 affords a stabilizing support for the dolly 14 through the action of the guide rollers 32 which are disposed in pairs and guided for rolling movement on the laterally projecting flanges disposed on opposite sides of the center web of the I-beam 36.

A brief description of an operating cycle of the present device from the time the automobile is driven onto the main carrying structure until it is deposited in any preselected stall will serve to emphasize the simplicity and effectiveness of the present device in performing the desired handling and transfer of the automobile. With the main carrying structure 10 positioned on the ground floor of the building, it is possible to drive or pull an automobile onto the structure 10 from either of its ends. For the purpose of illustrating the operation of the device, let us assume that the automobile, partially shown in dot-dash lines at the left hand side of Figure 1 is to be driven onto the main carrying structure 10; the first operation is to properly position the carriage 13 adjacent the far end of the main carrying structure 10 and then to properly position the dolly 14 with respect to the carriage 13.

In order to correctly position the dolly 14 to accommodate the automobile, the coupling 15 (not shown in Fig. 1) should be disengaged and the dolly 14 moved to the left until the entire dolly is within the confines of the movable main carrying structure 10; at which time the coupling 15 should be engaged with the depending lug 58 disposed at the opposite side of the transverse center of the dolly from the coupling position presently shown in Figure 1. With the carriage 13 and dolly 14 properly positioned at the far end of the main carrying structure 10, and with the movable automobile engaging means 18 disposed at the end of the dolly 14 which is toward the automobile in retracted position, the automobile may be driven onto the main carrying structure 10 to a position in which its front wheels contact the fixed automobile engaging means 17 on the dolly 14. The movable automobile engaging means 18 may be extended by energizing the proper solenoid 47 to move the piston rod 48 to transmit extending movement to the movable automobile engaging means 18, which are disposed behind the front wheels of the positioned automobile, through the action of the connecting linkage disposed between the tail rod 48 of the solenoid and the inner end of the movable automobile engaging means 18. The movement of the linkage disposed at one side of the longitudinal center of the dolly 14 is transmitted to similar linkage disposed on the opposite side of the dolly 14 through the medium of the chain 49 to thereby effect a similar extending movement to the movable automobile engaging means 18 disposed in axial alinement with the first mentioned movable automobile engaging means.

It should be noted at this point that the extending of the pair of auto engaging means 18 at one end of the dolly effects the simultaneous retraction of the pair of movable automobile engaging means disposed at the opposite end of the dolly. With the front wheels of the automobile thus disposed between the respective fixed and movable automobile engaging means projecting from opposite sides of the dolly 14, the automobile is secured against any appreciable longitudinal movement on the dolly 14, and the main carrying structure 10 may then be raised to the desired floor and moved laterally into proper alignment with a preselected stall 12 through the operation of any usual mechanism which is not illustrated for the reason that it forms no part of the present invention.

After the main carrying structure 10 has been moved into proper elevational and lateral alinement with the selected storage stall 12, the electric motor 29 may be energized to effect rotation of the driving pinion 31 which is disposed in meshing relationship with the chain 22 having its ends secured to the outer transverse members 20 of the main carrying structure 10 to effect movement of the carriage 13 on the main carrying structure toward the selected storage stall 12 to effect movement of the automobile into the stall (as at the right hand end of Fig. 1) through the action of the fixed automobile engaging means 17.

When the automobile is properly located in the selected stall, the movable automobile engaging means may be retracted by energizing the other cylinder 47 to reverse the operation previously described in effecting the extension of the movable automobile engaging means 18. After the automobile engaging means 18 have been retracted, the motor 29 may be re-energized to effect longitudinal movement of the coupled carriage 13 and dolly 14 on the main carrying structure 10 to return the projecting end portion of the dolly 14 onto the main carrying structure 10 so that the main carrying structure may be moved to another position in the elevator shaft to effect a similar transfer of another automobile. When it is desired to remove an automobile from any preselected stall 12, the above series of operations may be carried out in the reverse order.

From the foregoing detailed description of an illustrative embodiment of the present invention, it will readily be understood that a simple and effective means has been provided for effecting the transfer of an automobile to or from any preselected stall on any floor of a commercial garage where the latter is constructed in a manner to house a device embodying the teachings of the present invention.

While the invention has been described in considerable detail, in the foregoing specification, it is to be understood that various changes may be made in its embodiment without departing from or sacrificing any of the advantages hereinafter claimed.

What I claim is:

1. An automobile handling apparatus comprising a main carrying structure, a wheeled carriage guided for longitudinal movement on said structure, cooperating fixed and movable driving means on said structure and carriage, power driven means for actuating said movable driving means to effect movement of said carriage on said structure, a wheeled dolly supported for longitudinal movement on said structure, a coupling member on said carriage, a plurality of longitudinally spaced coupling receiving members on said dolly, said coupling receiving members being adapted to selectively receive said coupling member to establish a preselected relative coupled relationship between said carriage and said dolly, and automobile engaging means on said dolly to effect the transfer of an engaged automobile to or from said main carrying structure when said coupled carriage and dolly are moved.

2. An automobile handling apparatus comprising a main carrying structure, a wheeled carriage guided for longitudinal movement on said structure, cooperating fixed and movable driving means on said structure and carriage, power driven means for actuating said movable driving means to effect movement of said carriage on said structure, a wheeled dolly supported for longitudinal movement on said structure, a coupling member on said carriage, a plurality of longitudinally spaced coupling receiving members on said dolly, said coupling receiving members adapted to selectively receive said coupling member to establish a preselected relative coupled relationship between said carriage and said dolly, automobile engaging means on said dolly including a fixed member and movable member, and actuating means operative to selectively position said movable member into or out of active cooperating relationship with said fixed member whereby an automobile may be selectively engaged to effect its transfer to or from said main carrying structure in response to coupled movement of said carriage and dolly.

3. An automobile handling apparatus comprising a main carrying structure, a wheeled carriage guided for longitudinal movement on said structure, cooperating fixed and movable driving means on said structure and carriage, power driven means for actuating said movable driving means to effect movement of said carriage on said structure, a double-ended dolly partially supported for longitudinal movement on said structure by alined wheels disposed substantially midway between the ends of said dolly, a coupling member on said carriage, a plurality of spaced coupling receiving members on said dolly, said coupling receiving members being adapted to selectively receive said coupling member to establish a preselected relative coupled relationship between said carriage and said dolly whereby one or the other end of said dolly may be projected beyond said structure when said carriage is moved to one or the other extreme positions on said structure, a pair of fixed automobile engaging means disposed in spaced relationship on opposite sides of the transverse center of said dolly, and a pair of movable automobile engaging means disposed adjacent the opposite ends of said dolly and in spaced relationship respectively with the adjacent fixed means and operative to effect the transfer of an engaged automobile to or from the projected end of said dolly in response to movement of said coupled carriage and dolly on said structure.

4. An automobile handling apparatus comprising a main carrying structure, a wheeled carriage guided for longitudinal movement on said structure, cooperating fixed and movable driving means on said structure and carriage, power driven means for actuating said movable driving means to effect movement of said carriage on said structure, a double-ended dolly partially supported for longitudinal movement on said structure by alined wheels disposed substantially midway between the ends of said dolly, a coupling member on said carriage, a plurality of spaced coupling receiving members on said dolly, said coupling receiving members being adapted to selectively receive said coupling member to establish a preselected relative coupled relationship between said carriage and said dolly whereby one or the other end of said dolly may be projected beyond said structure when said carriage is moved to one or the other extreme positions on said structure, dolly support and guide means on said carriage, a pair of fixed automobile engaging means disposed in spaced relationship on opposite sides of the transverse center of said dolly, a pair of movable automobile engaging means on said dolly, and actuating means for selectively rendering one or the other pair of said movable means operative to engage and effect the transfer of an automobile to or from the projected end of said dolly in response to movement of said coupled carriage and dolly on said structure.

5. An automobile handling apparatus comprising a main carrying structure, a wheeled carriage guided for longitudinal movement on said structure, means for moving said carriage on said structure, a double-ended dolly partially supported for longitudinal movement on said structure by alined wheels disposed substantially midway between the ends of said dolly, a coupling member on said carriage, a plurality of spaced coupling receiving members on said dolly, said coupling receiving members being adapted to selectively receive said coupling member to establish a preselected relative coupled relationship between said carriage and said dolly whereby one or the other end of said dolly may be projected beyond said structure when said carriage is moved to one or the other extreme positions on said structure, first pairs of automobile engaging means disposed in spaced relationship on opposite sides of the transverse center of said dolly, and second pairs of automobile engaging means disposed adjacent the opposite ends of said dolly and in outwardly spaced relationship with the adjacent first pairs and operative to effect the transfer of an engaged automobile to or from the projected end of said dolly in response to movement of said coupled carriage and dolly on said structure, said second pairs being mounted for transverse movement into and out of automobile engaging position.

6. An automobile handling apparatus comprising a main carrying structure, a wheeled carriage guided for longitudinal movement on said structure, means for moving said carriage on said structure, a double-ended dolly partially supported for longitudinal movement on said structure by alined wheels disposed substantially midway between the ends of said dolly, a coupling member on said carriage, a plurality of spaced coupling receiving members on said dolly, said coupling receiving members being adapted to selectively receive said coupling member to establish a preselected relative coupled relationship between said carriage and said dolly whereby one or the other end of said dolly may be projected beyond said structure when said carriage is moved to one or the other extreme positions on said structure, cooperating guiding means on said carriage and dolly to guide said carriage for longitudinal movement beneath said dolly when said coupling members are out of coupled relationship, and automobile engaging means disposed at opposite ends of said dolly to selectively effect the transfer of an engaged automobile to or from either end of said main carrying structure when said coupled carriage and dolly are moved.

7. An apparatus for handling automobiles comprising a relatively long main carrying structure, a carriage of substantially less length than said main carrying structure guided for longitudinal movement from one end to the other of said relatively long main carrying structure, a dolly of substantially greater length than said carriage supported for longitudinal movement on said structure while superimposed on said carriage, releasably coupling means for selectively connecting said carriage in a position beneath one end or the other of said dolly, power driven means for effecting movement of said coupled carriage and dolly as a unit on said structure to cause said dolly to project from a selected end of said structure when said carriage is in an extreme position on said structure, and automobile engaging means on said dolly for effecting the transfer of an automobile to or from said main carrying structure when said coupled carriage and dolly are moved.

8. An apparatus for handling automobiles comprising a relatively long main carrying structure, a carriage of substantially less length than said main carrying structure guided for longitudinal movement from one end to the other of said relatively long main carrying structure, a dolly of substantially greater length than said carriage supported for longitudinal movement on said structure while superimposed on said carriage, releasable coupling means for selectively connecting said carriage in a position beneath one end or the other of said dolly, said coupling means including a movable pin on said carriage and a pin-receiving socket depending from the dolly adjacent each end thereof in a position to receive said pin when the carriage has been moved to a selected position with respect to the dolly, power driven means for effecting movement of said coupled carriage and dolly as a unit on said structure to cause said dolly to project from a selected end of said structure when said carriage is in an extreme position on said structure, and automobile engaging means on said dolly for effecting the transfer of an automobile to or from said main carrying structure when said coupled carriage and dolly are moved.

References Cited in the file of this patent

UNITED STATES PATENTS

| | | |
|---|---|---|
| 1,864,711 | Buetell | June 28, 1932 |
| 1,891,795 | Buetell | Dec. 20, 1932 |
| 1,973,605 | Buetell et al. | Sept. 11, 1934 |
| 2,016,662 | Aitken | Oct. 8, 1935 |
| 2,051,062 | Turner et al. | Aug. 18, 1936 |
| 2,065,107 | Turner et al. | Dec. 22, 1936 |
| 2,321,253 | Schellentrager | June 8, 1943 |
| 2,391,173 | Loftus et al. | Dec. 18, 1945 |
| 2,428,856 | Sinclair | Oct. 14, 1947 |
| 2,483,817 | Ehinger | Oct. 4, 1949 |
| 2,554,984 | Hegel | May 29, 1951 |
| 2,633,809 | Robinson et al. | Apr. 7, 1953 |